(12) United States Patent
Ando

(10) Patent No.: US 7,082,963 B2
(45) Date of Patent: Aug. 1, 2006

(54) GAS PRESSURE REDUCTION VALVE

(75) Inventor: Akira Ando, Aichi (JP)

(73) Assignee: Aisan Kogyo Kabushiki Kaisha, Aichi (JP)

( * ) Notice: Subject to any disclaimer, the term of this patent is extended or adjusted under 35 U.S.C. 154(b) by 271 days.

(21) Appl. No.: 10/778,421

(22) Filed: Feb. 13, 2004

(65) Prior Publication Data

US 2004/0168724 A1 Sep. 2, 2004

(30) Foreign Application Priority Data

Feb. 28, 2003 (JP) ............................ P2003-102240

(51) Int. Cl.
G05D 16/02 (2006.01)
G05D 16/06 (2006.01)

(52) U.S. Cl. .............................. 137/505.39; 137/505.42

(58) Field of Classification Search ............ 137/505.18, 137/505.39 I, 505.42

See application file for complete search history.

(56) References Cited

U.S. PATENT DOCUMENTS

| | | | | |
|---|---|---|---|---|
| 1,548,206 A | * | 8/1925 | Pirtle | 137/505.39 |
| 3,072,135 A | * | 1/1963 | Moskow | 137/116.5 |
| 3,451,421 A | * | 6/1969 | Vicenzi et al. | 137/495 |
| 3,612,618 A | * | 10/1971 | Swanson | 303/9.73 |
| 3,643,683 A | * | 2/1972 | Semon | 137/484.8 |
| 3,960,126 A | * | 6/1976 | Shinoda | 123/527 |
| 5,372,159 A | * | 12/1994 | Ziegelmeyer et al. | 137/505.14 |

FOREIGN PATENT DOCUMENTS

| | | |
|---|---|---|
| JP | 11-082780 | 3/1999 |
| JP | 11-304029 | 11/1999 |
| JP | 2000-248999 | 9/2000 |

OTHER PUBLICATIONS

Patent Abstracts of Japan for Publication No. 11-082780 published on Mar. 26, 1999 (1 page).
Patent Abstracts of Japan for Publication No. 11-304029 published on Nov. 5, 1999 (1 page).
Patent Abstracts of Japan for Publication No. 2000-248999 published on Sep. 12, 2000 (1 page).
Concise Statement of Relevancy Between The Invention and Materials (1 page).

* cited by examiner

*Primary Examiner*—Stephen M. Hepperle
(74) *Attorney, Agent, or Firm*—Osha Liang L.L.P.

(57) ABSTRACT

A first retainer and a second retainer are provided between a diaphragm and an upper housing. A first spring urges the diaphragm downward between the first retainer and the diaphragm. A second spring having an outer diameter smaller than that of the first spring urges the diaphragm downward between the first retainer and the second retainer.

3 Claims, 2 Drawing Sheets

GAS PRESSURE REDUCTION VALVE

BACKGROUND OF THE INVENTION

1. Field of the Invention

The present invention relates to a gas pressure reduction valve improved in pressure-controlling performance.

2. Description of the Related Art

It is known that a gas pressure reduction valve for reducing pressure of compressed natural gas (hereinafter, referred as CNG) in a fuel gas container of an automobile to a predetermined value for high-pressure gas such as CNG.

In JP-A-11-82780 (pages 3 and 4 and FIGS. 1 to 3), a pressure-controlling spring 21 for biasing a diaphragm 16 downward is interposed between a shell 19 and an screw 20 provided in a cover 15 so that the diaphragm 16 is moved up and down in accordance with balance between the biasing force of the pressure-controlling spring 21 and the fuel force of CNG in a compression chamber 14 to thereby keep the fuel pressure of CNG in the decompression chamber 14 to a predetermined low value.

In JP-A-11-304029 (page 2 and FIGS. 1 and 2), a diaphragm 16 is moved up and down in accordance with balance between the biasing force of a pressure-controlling spring 21 and the fuel pressure of CNG in a decompression chamber 14 so that a valve body 2 connected to a central portion of the diaphragm 17 is moved up against a spring 18 to balance the fuel pressure of a diaphragm chamber 16 in a position where the force of the spring 18 balances with the force caused by the fuel pressure of the diaphragm 17. Reduction in outlet pressure (regulated pressure) caused by increase in the flow rate of fuel is suppressed.

In JP-A-2000-248999 (page 3 and FIG. 1), a pressure-controlling spring 21 for biasing a diaphragm 16 downward is interposed between a shell 19 and an screw 20 provided in a cover 15 so that the diaphragm 16 is moved up and down in accordance with balance between the biasing force of the pressure-controlling spring 21 and the fuel pressure of CNG in a decompression chamber 14, that is, a pressure-controlling valve 10 is opened/closed to thereby keep the fuel pressure of CNG in the decompression chamber 14 to a predetermined low value.

In JP-A-11-82780, only one spring is provided though the pressure-controlling spring 21 for biasing the diaphragm 16 downward is interposed between the shell 19 and the screw 20 provided in the cover 15. The pressure gradient in a secondary pressure outlet cannot be kept constant because the spring constant increases.

In JP-A-11-304029, only one spring is provided though reduction in outlet pressure (regulated pressure) caused by increase in the flow rate of fuel is suppressed compared with the background art because the force of the spring balances with the force caused by the fuel pressure of the diaphragm in an equilibrium position. A pressure of an outlet 5 cannot be kept constant because the spring constant increases.

In JP-A-2000-248999, only one spring is provided though fuel pressure in a decompression chamber can be kept to a predetermined value because a force of the spring balances with the force caused by the fuel pressure of the diaphragm in an equilibrium position. A pressure of an outlet 22 cannot be kept constant because the spring constant increases.

SUMMARY OF THE INVENTION

It is an object of the invention is to provide a gas pressure reduction valve controls pressure by a diaphram and two springs having a synthetic spring constant lower than the spring constant only one spring is provided, so that the gas pressure reduction valve keeps secondary outlet pressure substantially constant.

In the gas pressure reduction valve, two springs are connected in series between a diaphragm and an upper housing.

According to one aspect of the invention, the two springs have the synthetic spring constant lower than the spring constant where only one spring is provided. The two springs are connected in series so that mounting loads imposed on the two springs respectively are set to be equal to each other and that change in biasing force of the springs in accordance with the displacement of the diaphragm can be suppressed.

According to another aspect of the invention, there is provided with the gas pressure reduction valve including: a first retainer between said diaphragm and said upper housing having a first spring of said at least two springs; a second retainer between said diaphragm and said upper housing having a second spring of said at least two springs; wherein said first spring is biased between said first retainer and said diaphragm, second spring is biased between said first and second retainers, and an outer diameter of said second spring is smaller than an outer diameter of said first spring.

Since the first and second springs are coaxially provided with the gas pressure reduction valve of the invention, the total length of the two springs can be reduced so that the size of the upper housing can be reduced in addition to the effect of the fist aspect of the invention.

DESCRIPTION OF PREFERRED EMBODIMENTS

Figure 1:
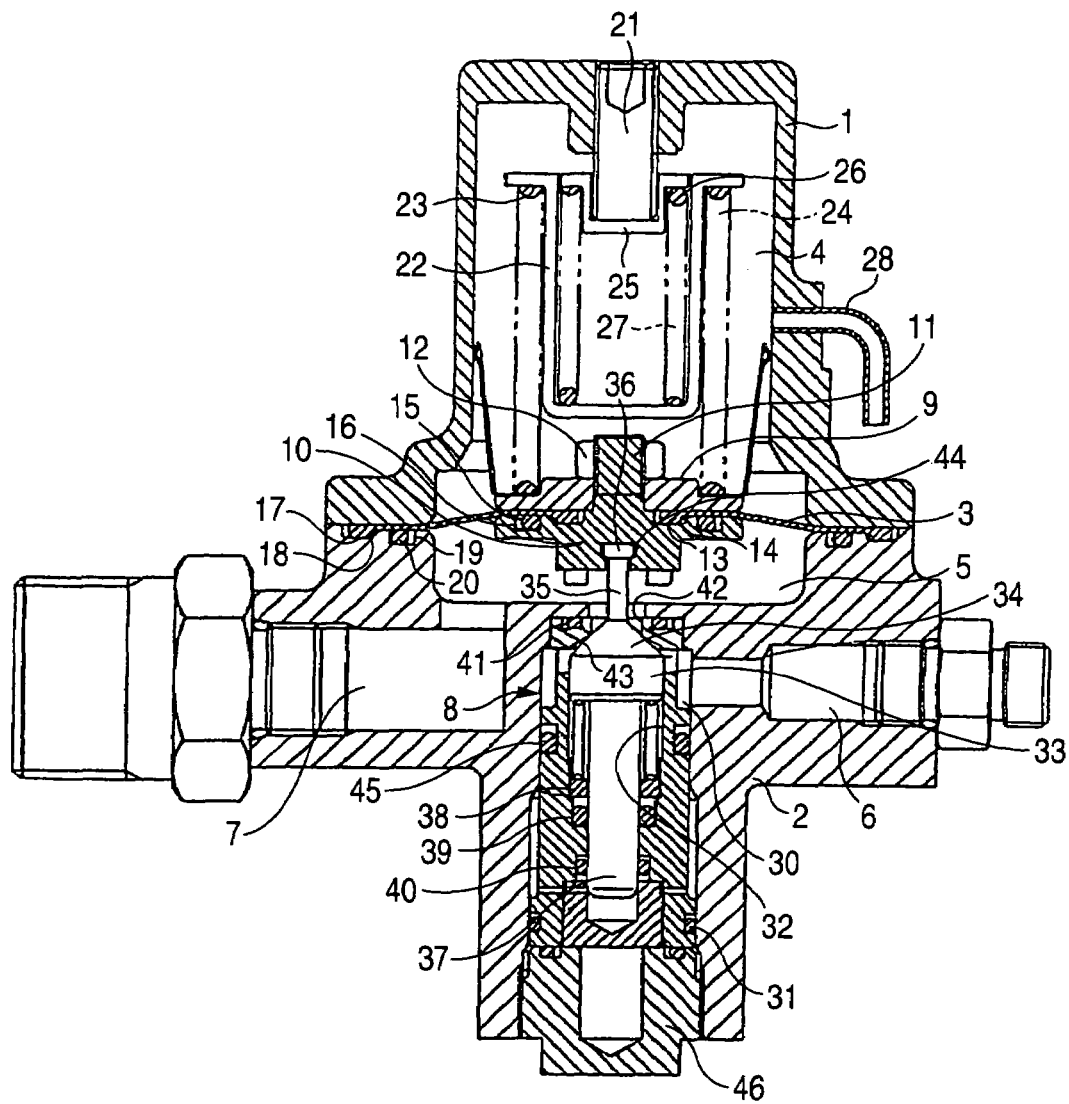
FIG. 1 is a vertical sectional view showing a first embodiment of the invention.

Embodiments will be described in detail with reference to the drawings. In FIG. 1, a diaphragm 3 is interposed between an upper housing 1 and a lower housing 2 to thereby form an air chamber 4 and a decompression chamber 5. A primary pressure inlet 6 and a secondary pressure outlet 7 are provided in the lower housing 2. A pressure-controlling valve 8 and the decompression chamber 5 are provided between the primary pressure inlet 6 and the secondary pressure outlet 7 so as to communicate with the primary pressure inlet 6 and the secondary pressure outlet 7. The primary pressure inlet 6 is connected to a gas cylinder not shown.

A fuel injection valve not shown is connected to the secondary pressure outlet 7. The diaphragm 3 is sandwiched between supports 9 and 10 and tightened by a combination of a screw portion 11 protruded from the center of the support 10 and a nut 12 so that airtightness is kept.

A lead 13 is provided in the diaphragm 3 so as to be fitted into an annular groove 14 provided in the support 10. An annular groove 15 having a diameter larger than that of the annular groove 14 is further provided in the support 10. An annular ring 16 is inserted in the annular groove 15 to keep air sealing. A lead 17 is provided annularly in the circumferential edge portion of the diaphragm 3 so as to be fitted into an annular groove 18 provided in the lower housing 2 to keep air sealing. An annular groove 19 is formed on the lower housing 2 side of the inside of the lead 17. An annular ring 20 is inserted in the annular groove 19 to keep air sealing.

An screw 21 is provided in the top portion of the upper housing 1 so that a biasing force of springs is adjusted by the screw 21. A first retainer 22 having a bottom and shaped like a cup is provided in the upper housing 1. The first retainer 22 has an upper portion opened so that a flange 23 extending outward is provided in the upper portion of the first retainer 22. A first spring 24 having a biasing force is provided between the flange 23 and the support 9. A second retainer 25 having a bottom and shaped like a cup is provided in the inside of the first retainer 22. The second retainer 25 is supported by the adjusting screw 21. The second retainer 25 has an upper portion opened so that a flange 26 extended outward is provided in the upper portion of the second retainer 25. A second spring 27 having an biasing force is provided between the bottom of the first retainer 22 and the flange 26 of the second retainer 25. That is, the first spring 24 and the second spring 27 are disposed in series.

The inner diameter of the first retainer 22 and the outer diameter of the second spring 27 are set to be substantially equal to each other. The outer diameter of the first retainer 22 and the inner diameter of the first spring 24 are set to be substantially equal to each other. Accordingly, the first retainer 22 is held so as to be vertically movable in a position concentric with the screw 21. The air chamber 4 of the upper housing 1 communicates with atmospheric air through a pipe 28.

A cylindrical chamber 30 is provided in the lower housing 2 so as to be located under the center of the diaphragm 3. The pressure-controlling valve 8 is provided in the chamber 30. A body 31 is provided in the chamber 30. A storage chamber 32 is provided in the center of the body 31. A valve body 33 is inserted in the storage chamber 32 so as to be vertically slidable. A seal surface 34 tapered toward a top end, that is, shaped like a cone, is formed in the upper portion of the valve body 33. A connection rod 35 and a joint 36 having a diameter larger than that of the connection rod 35 are formed at the top end of the seal surface 34. A guide rod 37 is formed at the lower end of the valve body 33 so as to be slidable in the inside of the body 31. Annular rings 38, 39 and 40 each made of an elastic substance are inserted in between the storage chamber 32 and the guide rod 37 to thereby align the valve body 33. A spring 45 for always biasing the valve body 33 upward is inserted in between the lower end surface of the valve body 33 and the annular ring 38. A plug 46 is forced into the lower end of the chamber 30 of the body 31 to prevent the body 31 from dropping out.

A seat 41 is provided in the chamber 30 so as to be located opposite to the valve body 33. A flow hole 42 is provided in the central portion of the seat 41. A tapered seat surface 43 is formed so as to extend downward from the flow hole 42. The pressure-controlling valve 8 controls the flow rate on the basis of a gap formed between the seal surface 34 of the valve body 33 and the seat surface 43 of the seat 41. The joint 36 is inserted in a joint hole 44 which has an outer diameter smaller than that of the joint 36 and which is formed in the support 10. In this manner, the joint 36 transmits displacement of the diaphragm 3.

Next, the relation between the first spring 24 and the second spring 27 will be described. Synthetic spring constant k is given by the expression (1):

$$k = k1 \cdot k2/(k1+k2) \tag{1}$$

in which k1 is the spring constant of the first spring 24, and k2 is the spring constant of the second spring 27.

When only one spring is provided, the synthetic spring constant k is equal to k1. When two springs are connected in series, the synthetic spring constant k becomes smaller than that in the case where only one spring is provided. Accordingly, the spring constant can be reduced in spite of the displacement of the diaphragm 3. For this reason, change in spring load can be suppressed though set load is unchanged. In addition, the second spring 27 having a small diameter is concentrically stored in the first spring 24 having a large diameter. When the two springs are used, the spring structure can be formed more compactly on the assumption that set load is constant.

Figure 2:
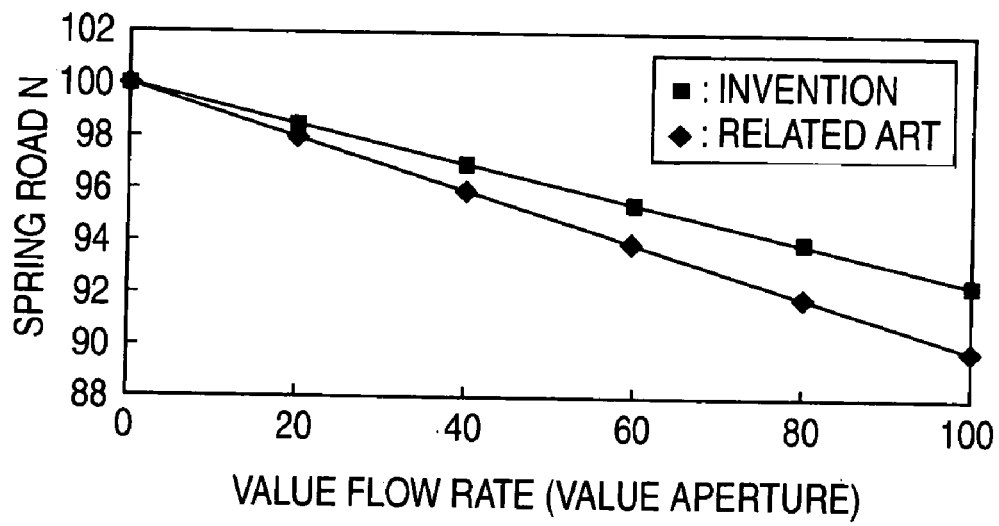
FIG. 2 is a characteristic graph showing comparison in spring load between the invention and the related art.
Figure 3:
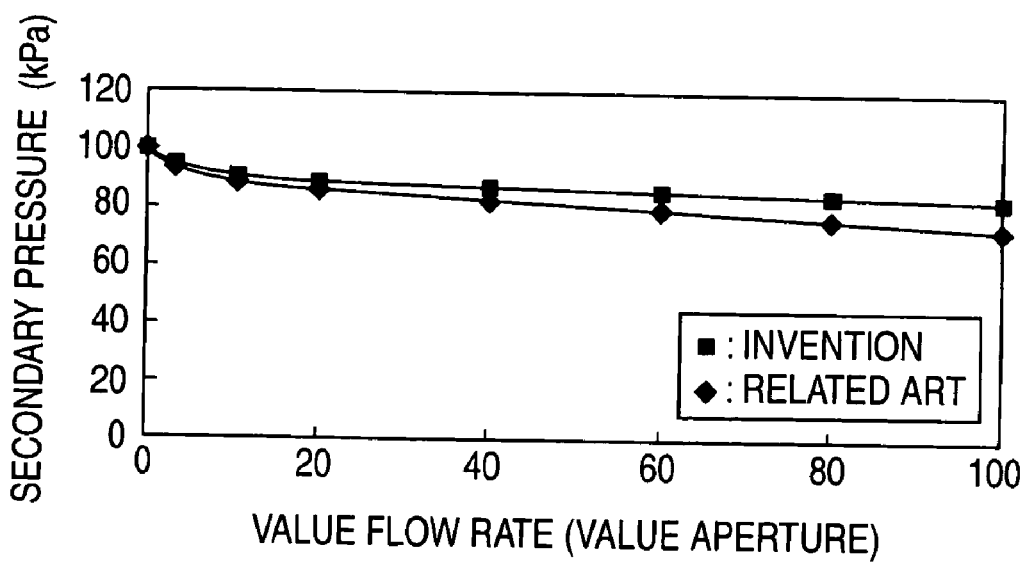
FIG. 3 is a characteristic graph showing comparison in secondary pressure between the invention and the related art.

Next, the function of the aforementioned configuration will be described with reference to FIGS. 1 to 3. When high-pressure gas fuel is not provided from a gas cylinder (not shown), the pressure of the decompression chamber 5 is lower than the biasing force of the first and second springs 24 and 27. Accordingly, the connection rod 35 is pushed down. As a result, the seal surface 34 of the valve body 33 and the seat surface 43 of the seat 41 are separated from each other, so that the flow hole 42 is opened. When high-pressure gas fuel is then provided, the gas fuel flows into the decompression chamber 5 through the flow hole 42. Pressure increases instantaneously because a fuel injection valve (not shown) is connected to the secondary pressure outlet 7. As a result, pressure is applied on the lower surface of the diaphragm 3 to move up the diaphragm 3 against the biasing force of the first and second springs 24 and 27. Because the connection rod 35 moves up along with the diaphragm 3, the valve body 33 moves up to bring the seal surface 34 close to the seat surface 43 to thereby control pressure to a predetermined value in accordance with pressure balance. When the fuel injection valve is controlled to be opened by a controller, the pressure of the decompression chamber 5 is reduced. As a result, the gas pressure reduction valve is operated in the aforementioned manner to thereby regulate pressure.

On this occasion, because the two springs are disposed in series, the total set load imposed on the first and second springs 24 and 27 is set to be equal to the set load in the case where only one spring is provided. Accordingly, the quantity of displacement of the diaphragm 3 becomes large compared with the quantity of pressure change. The quantity of change in opening area of the flow hole 42 increases in spite of a small pressure change. Accordingly, response characteristic is improved, so that change in outlet pressure is suppressed. FIGS. 2 and 3 are characteristic graphs. The spring constant in the related art is 8.12 [N/mm]. The spring constant k1 of the first spring 24 and the spring constant k2 of the second spring 27 in the invention are 4.06 [N/mm] and 3.42 [N/mm] respectively. When the synthetic spring constant k is calculated according to the expression (1), k=7.48 [N/mm] is obtained. Accordingly, the synthetic spring constant can be reduced compared with the related art, so that change in spring load can be reduced compared with the background art though set load is constant. In comparison between the invention and the related art, as shown in FIG. 2, the spring load gradient with respect to the valve flow rate (valve aperture) in the invention in which two springs are used in series is lower than that in the related art in which only one spring is used. Consequently, as is obvious from FIG. 3, the pressure gradient in the secondary pressure outlet with respect to the valve flow rate in the invention is lower than that in the related art.

As described above, in the fuel supply device according to the aforementioned embodiment, there can be achieved a gas pressure reduction valve in which response to pressure change can be made properly even in the case where the pressure change is slight and in which the pressure gradient in the secondary pressure outlet is low.

[Effect of the Invention]

(1) According to one aspect of the invention, there can be achieved a gas pressure reduction valve in which response to pressure change can be made properly even in the case where the pressure change is slight and in which the pressure gradient in the secondary pressure outlet is lower than that in the related art.

(2) According to another aspect of the invention, the first spring having a large diameter and the second spring having a small diameter are disposed concentrically. In addition to the effect as in (1), the total length of the springs can be reduced, so that the size of the gas pressure reduction valve can be reduced compared with the related art.

What is claimed is:

1. A gas pressure reduction valve, comprising:
    an upper housing;
    a lower housing having flow path between a primary pressure inlet and secondary pressure outlet;
    a diaphragm;
    an air chamber formed between said upper housing and said lower housing via said diaphragm, which has spring for biasing said diaphragm downward;
    a decompression chamber formed between said upper housing and said lower housing via said diaphragm, which has a pressure-controlling valve body moving upward and downward with said diaphragm and a pressure controlling valve forming a valve seat opposite to said pressure-controlling valve body,
    wherein said flow path communicates with said decompression chamber via said valve seat,
    said gas pressure reduction valve decreases a gas pressure of said flow path by opening and closing said pressure-controlling valve, and
    said spring has at least two coaxial springs communicating in series between said diaphragm and said upper housing;
    a first retainer disposed between said diaphraam and said upper housing having a first spring of said at least two coaxial springs; and
    a second retainer having a cup-like shape disposed inside the first retainer and disposed between said diaphragm and said upper housing having a second spring of said at least two coaxial springs;
    wherein said first spring is biased between said first retainer and said diaphragm, said second spring is contained in the first spring and is biased between said first and second retainers, and
    an outer diameter of said second spring is smaller than an outer diameter of said first spring.

2. The gas pressure reduction valve according to claim 1, further comprising:
    a screw which is provided in a top portion of said upper housing and adjusting a biasing force of said first and second springs.

3. The gas pressure reduction valve according to claim 1, wherein said gas pressure reduction valve is used for a fuel gas container of an automobile.

* * * * *